United States Patent
Tsuji et al.

(10) Patent No.: US 8,083,414 B2
(45) Date of Patent: Dec. 27, 2011

(54) BUSH BEARING

(75) Inventors: Kohachi Tsuji, Ritto (JP); Yuzo Makinae, Ritto (JP); Shigeru Kajiwara, Toyota (JP)

(73) Assignee: Oiles Corporation, Tokyo (JP)

( * ) Notice: Subject to any disclaimer, the term of this patent is extended or adjusted under 35 U.S.C. 154(b) by 1420 days.

(21) Appl. No.: 10/580,609

(22) PCT Filed: Nov. 25, 2003

(86) PCT No.: PCT/JP03/15017
§ 371 (c)(1),
(2), (4) Date: May 25, 2006

(87) PCT Pub. No.: WO2005/052394
PCT Pub. Date: Jun. 9, 2005

(65) Prior Publication Data
US 2007/0092173 A1   Apr. 26, 2007

(51) Int. Cl.
*F16C 33/02* (2006.01)
(52) U.S. Cl. ............... 384/276; 384/902; 384/912
(58) Field of Classification Search ............ 384/276, 384/279, 297, 299, 300, 301, 902, 912, 913
See application file for complete search history.

(56) References Cited

U.S. PATENT DOCUMENTS

| | | | | |
|---|---|---|---|---|
| 4,277,113 A | * | 7/1981 | Heshmat | 384/124 |
| 4,561,835 A | * | 12/1985 | Sakamaki et al. | 418/173 |
| 5,732,322 A | * | 3/1998 | Nakamaru et al. | 428/550 |
| 5,911,513 A | * | 6/1999 | Tsuji et al. | 384/276 |
| 5,927,862 A | * | 7/1999 | Debnam et al. | 384/439 |
| 6,139,191 A | * | 10/2000 | Andler et al. | 384/276 |
| 6,250,815 B1 | * | 6/2001 | Picone et al. | 384/557 |
| 6,548,188 B1 | * | 4/2003 | Yanase et al. | 428/626 |
| 6,609,830 B2 | * | 8/2003 | Bank et al. | 384/276 |
| 2002/0025095 A1 | | 2/2002 | Brandenstein | |
| 2005/0018936 A1 | * | 1/2005 | Yoshimura et al. | 384/276 |

FOREIGN PATENT DOCUMENTS

| | | |
|---|---|---|
| DE | 101 35 588 A1 | 2/2002 |
| GB | 2 365 498 A | 2/2002 |
| JP | 59-212508 | 12/1984 |
| JP | 59-212508 A | 12/1984 |
| JP | 61-115625 | 6/1986 |
| JP | 61-115625 A | 6/1986 |
| JP | 2001-132756 | 5/2001 |
| JP | 2001-132756 A | 5/2001 |

* cited by examiner

*Primary Examiner* — James Pilkington
*Assistant Examiner* — Alan Waits
(74) *Attorney, Agent, or Firm* — Nixon & Vanderhye P.C.

(57) ABSTRACT

A bush bearing (1) is a wrapped bush bearing which has a cylindrical inner peripheral surface (2) serving as a sliding surface as well as an outer peripheral surface (3), and whose abutting faces (4) are abutted against each other. The outer peripheral surface (3) includes a cylindrical surface (11); a tapered surface (13) interposed between the cylindrical surface (11) and one annular end face (12) in an axial direction X and formed by roll forming; a smooth circular arc surface (14) interposed between the tapered surface (13) and the cylindrical surface (11); and a smooth circular arc surface (15) interposed between the tapered surface (13) and the end face (12).

12 Claims, 3 Drawing Sheets

US 8,083,414 B2

BUSH BEARING

This application is the US national phase of international application PCT/JP2003/015017, filed 25 Nov. 2003, which designated the U.S., the entire content of which is hereby incorporated by reference.

TECHNICAL FIELD

The present invention relates to a bush bearing for rotatably supporting a shaft, and more particularly to a bush bearing which is secured at its outer peripheral surface to a housing, for rotatably supporting at its inner peripheral surface a shaft.

BACKGROUND ART

A bush bearing as a sliding bearing has advantages in that, as compared with a rolling bearing, the bush bearing is low-priced, and the amount of noise generated is low, so that it excels in the low noise characteristic. Because of such advantages, the bush bearings are used in numerous fields including compressors of automobiles and the like.

The bush bearing is normally press fitted in a hole of a housing, is secured at its outer peripheral surface to the housing, and is adapted to rotatably support at its inner peripheral surface a shaft. To facilitate the press fitting into the housing hole, a tapered surface is formed at an outer peripheral surface on the end face side of the bush bearing.

Incidentally, if a cutting tool (single point tool) is merely abutted against the outer peripheral surface on the end face side of the bush bearing to shave it off so as to form such a tapered surface, there is a possibility that very small burrs are produced on that outer peripheral surface. At the time of the press fitting of the bush bearing into the housing hole, these burrs can fall off and remain in the housing hole as dust (e.g., metal powder dust). This dust can enter between the inner peripheral surface of the bush bearing and the shaft, making it impossible to ensure smooth rotation of the shaft. In addition, particularly in an aluminum-made housing, there is a possibility that the inner peripheral surface of the housing defining the hole is shaved by the burrs at the time of the press fitting of the bush bearing into the housing hole, and aluminum chips are produced. These aluminum chips can enter between the inner peripheral surface of the bush bearing and the shaft, making it impossible to ensure smooth rotation of the shaft.

Furthermore, if the wall thickness on the end face side of the bush bearing becomes extremely small owing to the tapered surface formed, the end face side of the bush bearing becomes easily deformed in the press fitting into the housing hole, making it impossible to assure the roundness of the inner peripheral surface of the bush bearing. Meanwhile, if the tapered surface is formed so as to enlarge the wall thickness on the end face side of the bush bearing in order to avoid this, the positioning and fixation of the bush bearing with respect to the housing hole prior to the press fitting into the housing hole become difficult; moreover, the guiding action based on the tapered surface in the press fitting into the housing hole is practically lost, possibly crushing the end face side of the bush bearing or unnecessarily enlarging the diameter of the open end of the housing hole.

DISCLOSURE OF THE INVENTION

The present invention has been devised in view of the above-described problems, and its object is to provide a bush bearing which makes it possible to eliminate the occurrence of dust (e.g., metal powder dust, particularly aluminum chips) at the time of the press fitting into the housing hole, which makes it possible to easily perform the press fitting without crushing the open end and the like of the hole to be press fitted into, and which makes it possible to ensure the roundness of the inner peripheral surface even after the press fitting.

The bush bearing in accordance with a first aspect of the invention is a cylindrical bush bearing whose inner peripheral surface is a sliding surface, wherein an outer peripheral surface of the bush bearing has a cylindrical surface and a tapered surface interposed between the cylindrical surface and at least one annular axial end face of the bush bearing and formed by press forming, and if the wall thickness at the cylindrical surface of the bush bearing is assumed to be t, a difference $\delta$ (=r1−r2) between a radius r1 at the cylindrical surface of the bush bearing and a radius r2 at an outer peripheral edge of the one annular end face is in a range of not less than 0.1 t and not more than 0.3 t.

According to the bush bearing in accordance with the first aspect, since the tapered surface is formed by press forming, no burrs are produced at the outer peripheral surface. Therefore, at the time of the press fitting into the housing hole, dust (e.g., metal powder dust, particularly aluminum chips) is not produced. Moreover, since the difference $\delta$ is not less than 0.1 t, it is possible to secure an outer peripheral edge of the annular end face having a small diameter with respect to a hole diameter of the housing. As a result, it is possible to reliably perform the alignment with the housing hole prior to the press fitting into the housing hole, and to ensure the guiding action based on the tapered surface in the press fitting into the housing hole. In addition, since the difference $\delta$ is not more than 0.3 t, it is possible to secure the wall thickness of the annular end face to such an extent that the deformation of the end face side does not occur in the press fitting into the housing hole. As a result, it becomes possible to assure the roundness of the inner peripheral surface even after the press fitting.

In the bush bearing in accordance with the invention, the wall thickness t is not particularly limited, but it is possible to cite as a preferred example the wall thickness t of 0.5 mm to 5.0 mm, and as a more preferred example, the wall thickness t of 1.0 mm to 3.0 mm.

As for the bush bearing in accordance with a second aspect of the invention, in the bush bearing according to the first aspect, the tapered surface extends in an axial direction continuously from the one annular end face, and the cylindrical surface extends continuously in the axial direction from the tapered surface toward another axial end face of the bush bearing.

The bush bearing in accordance with the invention may be an endless cylindrical one (a bush bearing which does not have abutting faces), but as in a third aspect thereof the bush bearing is preferably constituted by a wrapped bush bearing in which a plate having the sliding surface on one surface is convoluted into a cylindrical shape such that the sliding surface is positioned on an inner peripheral side.

As for the bush bearing in accordance with a fourth aspect of the invention, in the bush bearing according to the third aspect, the plate is constituted by a multilayered plate which includes a back plate coated with copper, a porous sintered metal layer adhered integrally to a copper coating layer on one surface of the back plate, and a sliding layer including a synthetic resin with which the porous sintered metal layer is impregnated, and which has self-lubricity and wear resistance, a portion of the sliding layer which includes the synthetic resin being formed on one surface of the porous sintered metal layer, and the wrapped bush bearing is formed by convoluting the multilayered plate into the cylindrical shape such that the sliding layer is positioned on the inner peripheral side.

The thickness of the copper coating layer which covers the back plate is preferably 1 μm to 10 μm, more preferably 3 μm to 5 μm, and such a coating layer may be formed by plating treatment of the back plate.

As a steel plate used as the back plate, it is possible to use such as a cold rolled steel (SPCC: JIS G 4141) or a structural rolled steel (SS: JIS G 3101) having a plate thickness of 0.3 mm to 3.0 mm, preferably a plate thickness of 0.6 mm to 1.8 mm.

As the metal powder for forming the porous sintered metal layer, a powder of a copper alloy is used which generally passes 100 mesh sieve, such as bronze, lead bronze, or phosphor bronze which excels in frictional wear characteristics as the metal itself. Depending on purposes, however, it is also possible to use a powder of an aluminum alloy or iron, other than the copper alloy. As the form of particle of this metal powder, it is possible to use one which is in lump form, spherical form, or irregular form. Preferably, the thickness of this porous sintered metal layer is generally 0.15 to 0.4 mm, particularly 0.2 to 0.3 mm. Preferably, the porosity is generally not less than 10% by volume, particularly 15 to 40% by volume.

As the synthetic resin which has self-lubricity and wear resistance and serves as the sliding layer forming material, it is possible to cite as preferred examples polytetrafluoroethylene resin, polytetrafluoroethylene resin containing a filler material such as lead or polyimide resin, polyacetal resin or oil-containing polyacetal resin containing a lubricating oil.

As for the bush bearing in accordance with a fifth aspect of the invention, in the bush bearing according to the fourth aspect, the tapered surface is constituted by an exposed surface of the copper coating layer.

As for the bush bearing in accordance with a sixth aspect of the invention, in the bush bearing according to any one of the first to fifth aspects, the tapered surface extends in the axial direction between the cylindrical surface and the one annular end face so as to be flat or convex toward an outside.

As for the bush bearing in accordance with a seventh aspect of the invention, in the bush bearing according to any one of the first to sixth aspects, a smooth circular arc surface is interposed between the tapered surface and the cylindrical surface. As in the bush bearing in accordance with an eighth aspect of the invention, such a smooth circular arc surface preferably has a radius of curvature which is not less than 0.1 mm and not more than 1.0 mm.

As for the bush bearing in accordance with a ninth aspect of the invention, in the bush bearing according to any one of the first to eighth aspects, a smooth circular arc surface is interposed between the tapered surface and the one annular end face. As in the bush bearing in accordance with a 10th aspect of the invention, such a smooth circular arc surface preferably has a radius of curvature which is not less than 0.1 mm and not more than 0.5 mm.

As for the bush bearing in accordance with a 11th aspect of the invention, in the bush bearing according to any one of the first to 10th aspects, an angle of intersection, θ, between the tapered surface and an axial line is not less than 15° and not more than 25°.

The tapered surface in the invention is formed by press forming, as described above, but in the press forming, the tapered surface is preferably formed by roll forming, as in the bush bearing in accordance with a 12th aspect of the invention.

In the invention, the outer peripheral surface of the bush bearing is sufficient if it has a tapered surface interposed between the cylindrical surface and at least one annular axial end face of the bush bearing. Preferably, however, as in the bush bearing in accordance with a 13th aspect of the invention, the outer peripheral surface of the bush bearing further has, in addition to such a tapered surface, another tapered surface interposed between the cylindrical surface and the other annular axial end face of the bush bearing.

The other tapered surface may be formed in the same way as the aforementioned tapered surface as in the bush bearing in accordance with 14th to 22nd aspects of the invention.

According to the invention, it is possible to provide a bush bearing which makes it possible to eliminate the occurrence of dust (e.g., metal powder dust, particularly aluminum chips) at the time of the press fitting into the housing hole, which makes it possible to easily perform the press fitting without crushing the open end and the like of the hole to be press fitted into, and which makes it possible to ensure the roundness of the inner peripheral surface even after the press fitting.

Hereafter, a description will be given of the present invention and the mode for carrying out the invention with reference to the preferred embodiment shown in the drawings. It should be noted that the present invention is not limited to the embodiment.

BEST MODE FOR CARRYING OUT THE INVENTION

Figure 1:
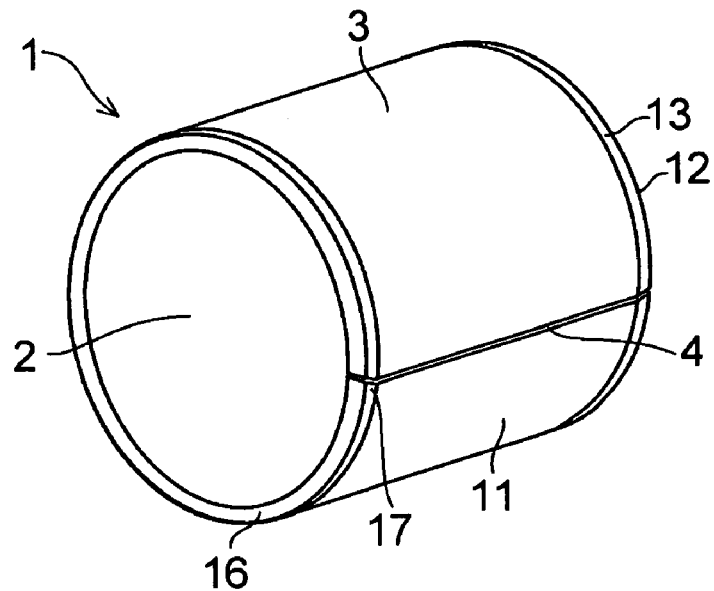
FIG. 1 is a perspective view of a preferred embodiment of the invention.
Figure 2:
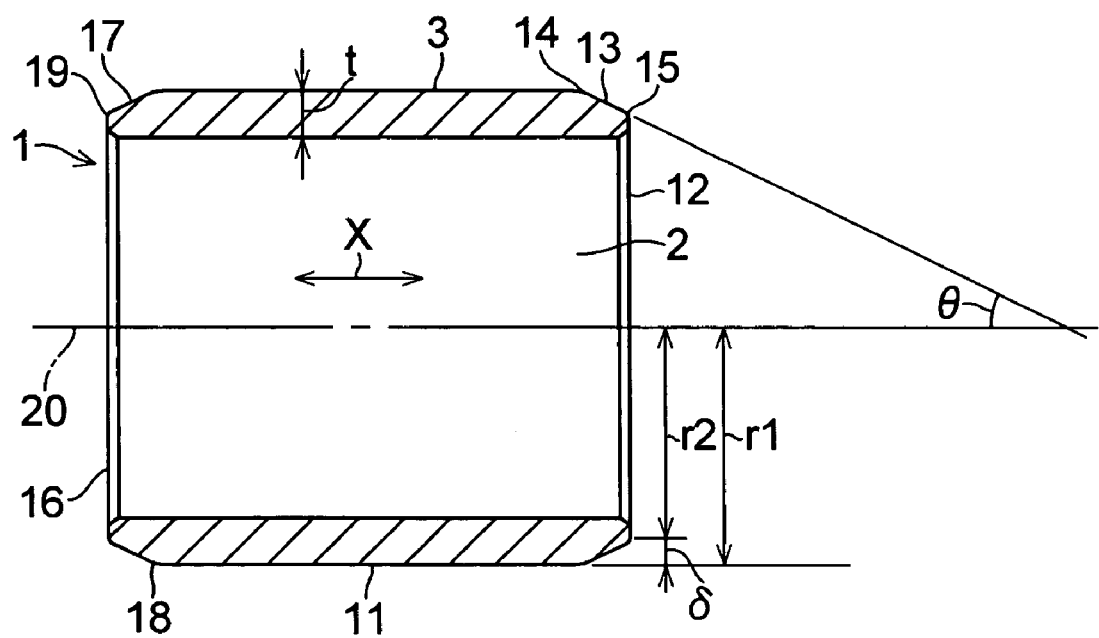
FIG. 2 is a cross-sectional view of the embodiment shown in FIG. 1.
Figure 3:
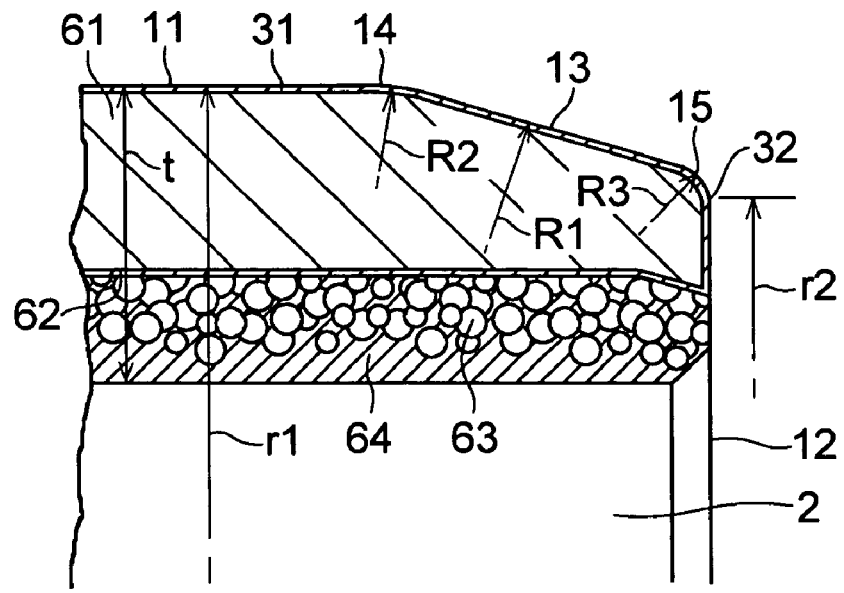
FIG. 3 is an explanatory partially enlarged cross-sectional view of the embodiment shown in FIG. 1.

In FIGS. 1 to 3, a cylindrical bush bearing 1 in accordance with this embodiment is a wrapped bush bearing which has a cylindrical inner peripheral surface 2 serving as a sliding surface as well as an outer peripheral surface 3, and whose abutting faces 4 are abutted against each other.

The outer peripheral surface 3 includes a cylindrical surface 11; a tapered surface 13 interposed between the cylindrical surface 11 and one annular end face 12 in an axial direction X and formed by press forming, or roll forming in the press forming in this embodiment; a smooth circular arc surface 14 interposed between the tapered surface 13 and the cylindrical surface 11; a smooth circular arc surface 15 interposed between the tapered surface 13 and the end face 12; a tapered surface 17 interposed between the cylindrical surface 11 and the other annular end face 16 in the axial direction X and formed by press forming, or roll forming in the press forming in this embodiment; a smooth circular arc surface 18 interposed between the tapered surface 17 and the cylindrical surface 11; and a smooth circular arc surface 19 interposed between the tapered surface 17 and the end face 16.

Since each of the tapered surface 17, the circular arc surface 18, and the circular arc surface 19 is constructed in the same way as each of the tapered surface 13, the circular arc surface 14, and the circular arc surface 15, a detailed description will be given hereafter of the side of the tapered surface 13, the circular arc surface 14, and the circular arc surface 15, and a description of the side of the tapered surface 17, the circular arc surface 18, and the circular arc surface 19 will be omitted.

The tapered surface 13, which extends between the cylindrical surface 11 and the end face 12 in such a manner as to be inclined in the axial direction X and is constituted by an exposed surface of a copper coating layer 31, extends in the axial direction X continuously from the end face 12 through the circular arc surface 15 so as to be flat or convex toward the outside with a radius of curvature R1. The cylindrical surface 11 extends continuously in the axial direction X from the tapered surface 13 through the circular arc surface 14 toward the end face 16 in the axial direction X and parallel to the axial direction X.

The smooth circular arc surface 14 interposed between the tapered surface 13 and the cylindrical surface 11 has a radius of curvature R2 which is not less than 0.1 mm and not more than 1.0 mm. The smooth circular arc surface 15 interposed between the tapered surface 13 and the end face 12 has a radius of curvature R3 which is not less than 0.1 mm and not more than 0.5 mm. An angle of intersection, $\theta$, between the tapered surface 13 and an axial line 20 is not less than 15° and not more than 25°.

If the wall thickness at the cylindrical surface 11 of the bush bearing 1 is assumed to be t, a difference $\delta$ (=r1−r2) between a radius r1 at the cylindrical surface 11 of the bush bearing 1 and a radius r2 at an outer peripheral edge 32 of the end face 12 is in a range of not less than 0.1 t and not more than 0.3 t.

Figure 4:
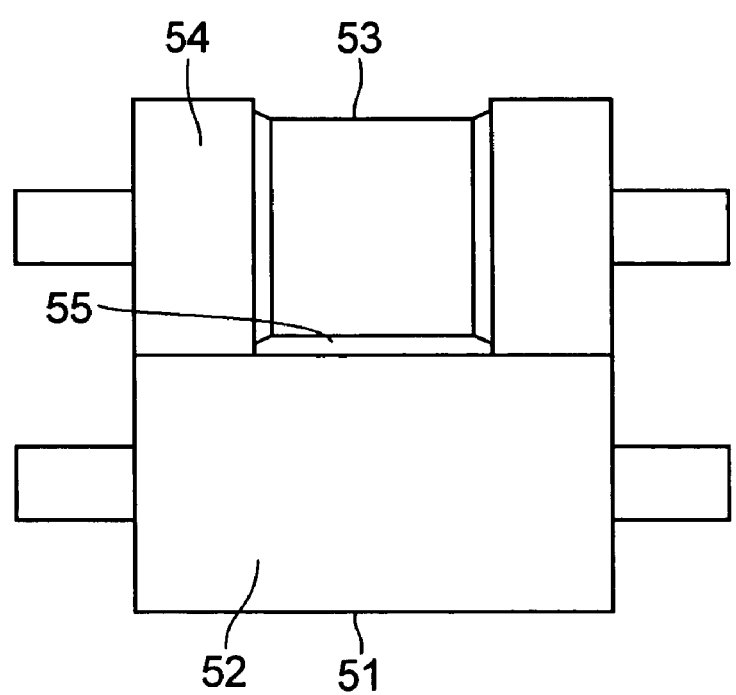
FIG. 4 is a diagram explaining a manufacturing method in accordance with the embodiment shown in FIG. 1.
Figure 5:
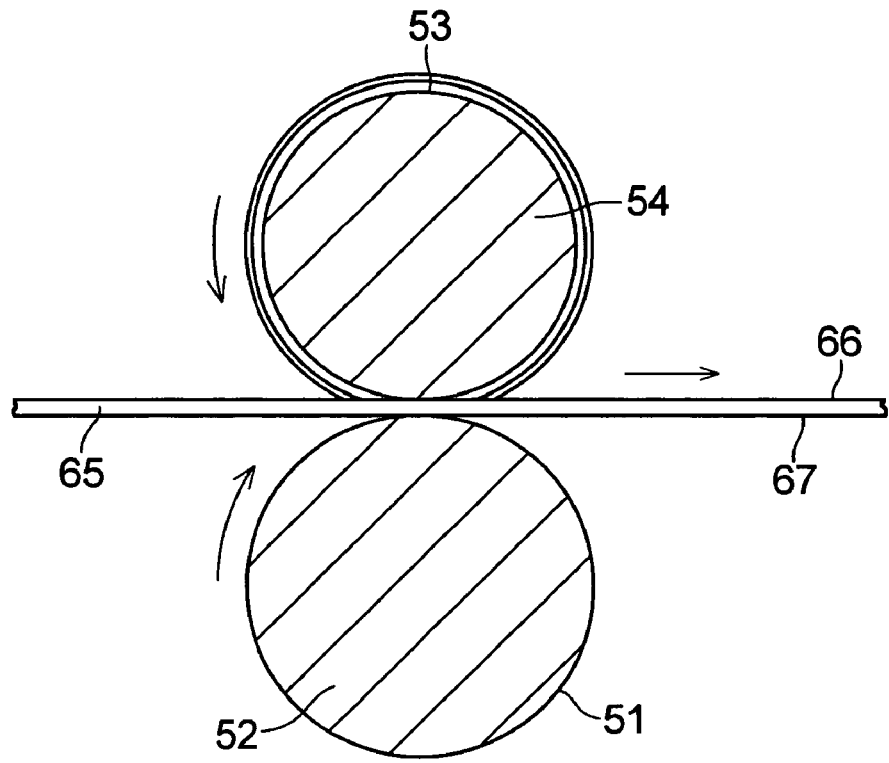
FIG. 5 is a diagram explaining the manufacturing method in accordance with the embodiment shown in FIG. 1.

The bush bearing 1 may be manufactured as follows. Namely, a press roller 52 having a cylindrical surface 51 as well as a press roller 54 having an annular recessed surface 53 of a shape complementary to the outer peripheral surface 3, such as those shown in FIGS. 4 and 5, are prepared. A belt-shaped plate 65 consisting of a multilayered plate is inserted into a space 55 formed by the cylindrical surface 51 of the press roller 52 and the annular recessed surface 53 of the press roller 54, wherein the multilayered plate includes a back plate 61 coated with copper serving as the coating layer 31, a porous sintered metal layer 63 adhered integrally to the copper coating layer 31 on one surface 62 of the back plate 61, and a sliding layer 64 including a synthetic resin with which the porous sintered metal layer 63 is impregnated, and which has self-lubricity and wear resistance, a portion of the layer 64 being formed on one surface of the porous sintered metal layer 63. This plate 65 is subjected to roll forming by the press rollers 52 and 54 which rotate, thereby forming on one surface 66 of the plate 65 a surface corresponding to the tapered surfaces 13 and 17 and the circular arc surfaces 14, 15, 18, and 19. Subsequently, the plate 65, which consists of such a multilayered plate and has on one surface a sliding surface 67 constituted by the exposed surface of the sliding layer 64 and on the other surface the surface 66 constituted by the exposed surface of the coating layer 31, is cut into an appropriate length to thereby form the plate 65 in the form of a strip. The strip-shaped plate 65 thus obtained is convoluted into a cylindrical shape such that the sliding surface 67 is positioned on the inner peripheral side. After this convolution, the thus convoluted plate 65 is subjected to upsetting, as required, to arrange the cylindrical shape, thereby obtaining the wrapped bush bearing 1 shown in FIGS. 1 to 3.

Figure 6:
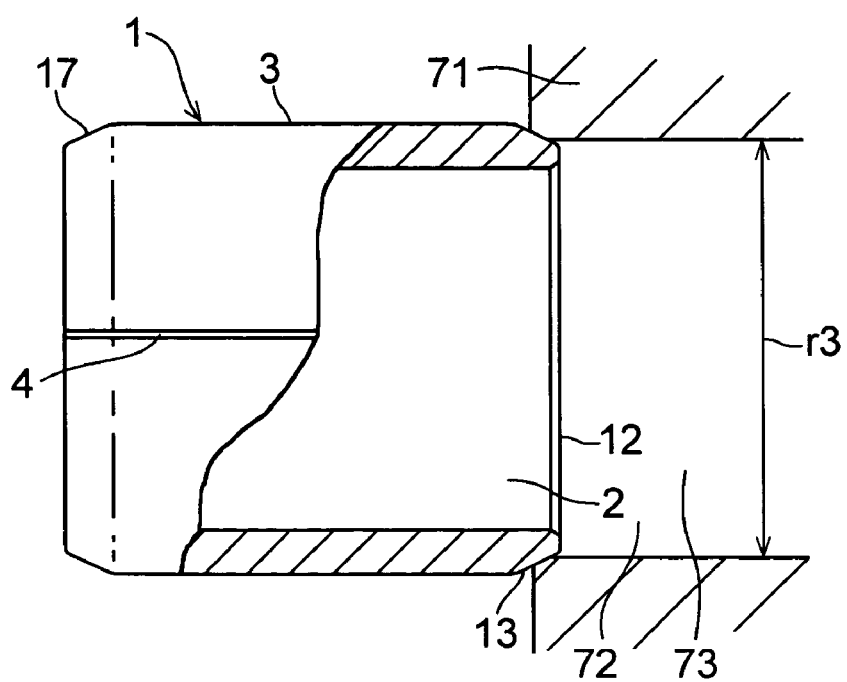
FIG. 6 is a diagram explaining an example of use in accordance with the embodiment shown in FIG. 1.

According to the bush bearing 1, since the tapered surface 13 is formed by roll forming, no burrs are produced at the outer peripheral surface 3. As a result, for example, at the time of press fitting into a hole 72 of an aluminum-made housing 71 of a compressor of an automobile, such as the one shown in FIG. 6, copper powder dust of the coating layer 31 due to burrs is not produced. Further, since an inner peripheral surface 73 of the housing 71 defining the hole 72 is not shaved by the burrs, aluminum chips are not produced. Moreover, since the difference $\delta$ is not less than 0.1 t, it is possible to secure the outer peripheral edge 32 of the annular end face 12 having a small diameter (=2·r2) with respect to a hole diameter r3 of the housing 71. As a result, it is possible to reliably perform the alignment with the hole 72 of the housing 71 prior to the press fitting into the hole 72 of the housing 71, and to ensure the guiding action based on the tapered surface 13 in the press fitting into the hole 72 of the housing 71. In addition, since the difference $\delta$ is not more than 0.3 t, it is possible to secure the wall thickness (radial width) of the end face 12 to such an extent that the deformation of the end face 12 side does not occur in the press fitting into the hole 72 of the housing 71. As a result, it becomes possible to assure the roundness of the inner peripheral surface 2 even after the press fitting with an interference.

The invention claimed is:

1. A combination of a cylindrical wrapped bush bearing and an aluminum-made housing in which the bush bearing is press fitted, said cylindrical bush bearing comprising an inner peripheral surface having a sliding surface, an outer peripheral surface having a cylindrical surface, one annular axial end face, another annular axial end face, and a tapered flat surface interposed and extending continuously in an axial direction from the one annular axial end face toward said other annular axial end face between the cylindrical surface and at least said one annular axial end face and formed by press forming, wherein a difference $\delta$ (=r1−r2) between a radius r1 of the cylindrical surface of the outer peripheral surface and a radius r2 of an outer peripheral edge of the one annular axial end face is in a range of not less than 0.1 t and not more than 0.3 t, where t is a wall thickness of the bush bearing at the cylindrical surface of the outer peripheral surface, wherein, the bush bearing including a multilayered plate which has the sliding surface on one surface thereof and is convoluted into a cylindrical shape such that the sliding surface is positioned on an inner peripheral side, said multilayered plate including a back plate entirely coated with copper, a porous sintered metal layer adhered integrally to a copper coating layer on one surface of the back plate, and a sliding layer including a synthetic resin with which the porous sintered metal layer is impregnated, and which has self-lubricity and wear resistance, a portion of said sliding layer being formed on one surface of the porous sintered metal layer, the cylindrical surface, the tapered surface and the one annular end face consisting of an exposed surface of the copper coating layer, said bush bearing further comprising a first smooth circular arc surface interposed between the tapered surface and the cylindrical surface, the first smooth circular arc surface having a radius of curvature which is not less than 0.1 mm and not more than 1.0 mm, and a second smooth circular arc surface interposed between the tapered surface and the one annular axial end face, the second smooth circular arc surface having a radius of curvature which is not less than 0.1 mm and not more than 0.5 mm, an angle $\theta$ of intersection between the tapered surface and an axial line being not less than 15° and not more than 25°, the outer peripheral edge of the one annular axial end face having a smaller diameter than a diameter of a hole of the aluminum-made housing in which the bush bearing is press fitted.

2. The combination according to claim 1, wherein the tapered surface is formed by roll forming.

3. The combination according to claim 1, wherein the outer peripheral surface of the bush bearing further has, in addition to the tapered surface interposed between the cylindrical surface and the one annular end face, another tapered surface interposed between the cylindrical surface and the other annular axial end face of the bush bearing and formed by press forming.

4. The combination according to claim 3, wherein the other tapered surface extends in the axial direction continuously from the other annular end face, and the cylindrical surface extends continuously in the axial direction from the other tapered surface toward the one axial end face of the bush bearing.

5. The combination according to claim 3, wherein the other tapered surface extends in the axial direction between the cylindrical surface and the other annular end face so as to be flat or convex toward the outside.

6. The combination according to claim 3, wherein a smooth circular arc surface is interposed between the other tapered surface and the cylindrical surface.

7. The combination according to claim 6, wherein the smooth circular arc surface interposed between the other tapered surface and the cylindrical surface has a radius of curvature which is not less than 0.1 mm and not more than 1.0 mm.

8. The combination according to claim 3, wherein a smooth circular arc surface is interposed between the other tapered surface and the other annular end face.

9. The combination according to claim 8, wherein the smooth circular arc surface interposed between the other tapered surface and the other annular end face has a radius of curvature which is not less than 0.1 mm and not more than 0.5 mm.

10. The combination according to claim 3, wherein an angle of intersection, θ, between the other tapered surface and the axial line is not less than 15° and not more than 25°.

11. The combination according to claim 3, wherein the other tapered surface is formed by roll forming.

12. The combination according to claim 3, wherein the other tapered surface is constituted by an exposed surface of the copper coating layer.

* * * * *